United States Patent
Ye et al.

(10) Patent No.: US 8,971,075 B2
(45) Date of Patent: Mar. 3, 2015

(54) METHOD AND APPARATUS FOR GENERATING AN ADAPTIVE SWITCHING FREQUENCY FOR OPERATING POWER FACTOR CORRECTION CIRCUIT

(75) Inventors: Zhong Ye, Plano, TX (US); Bosheng Sun, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 451 days.

(21) Appl. No.: 13/365,528

(22) Filed: Feb. 3, 2012

(65) Prior Publication Data

US 2012/0200268 A1   Aug. 9, 2012

Related U.S. Application Data

(60) Provisional application No. 61/440,146, filed on Feb. 7, 2011.

(51) Int. Cl.
*H02M 7/217* (2006.01)
*H02M 1/42* (2007.01)

(52) U.S. Cl.
CPC ............ *H02M 1/4225* (2013.01); *Y02B 70/126* (2013.01)
USPC .......................................................... 363/89

(58) Field of Classification Search
CPC ..................................................... H02M 1/4225
USPC .......................................................... 363/89
See application file for complete search history.

(56) References Cited

U.S. PATENT DOCUMENTS

| | | | |
|---|---|---|---|
| 7,012,413 B1 * | 3/2006 | Ye ................................. | 323/284 |
| 7,167,384 B2 * | 1/2007 | Yasumura ..................... | 363/127 |
| 7,205,749 B2 | 4/2007 | Hagen | |
| 7,999,524 B2 | 8/2011 | O'Loughlin | |
| 8,379,420 B2 * | 2/2013 | Orr ................................ | 363/80 |
| 2002/0021576 A1 * | 2/2002 | Gattavari et al. ............... | 363/89 |
| 2007/0139984 A1 * | 6/2007 | Lo .................................. | 363/89 |
| 2011/0261599 A1 * | 10/2011 | Duerbaum et al. ............. | 363/89 |
| 2012/0200268 A1 * | 8/2012 | Ye et al. ........................ | 323/210 |
| 2012/0274290 A1 * | 11/2012 | Ye et al. ........................ | 323/234 |
| 2013/0033240 A1 * | 2/2013 | Ye ................................. | 323/211 |
| 2014/0078798 A1 * | 3/2014 | Turchi ............................ | 363/89 |
| 2014/0140113 A1 * | 5/2014 | Oh ................................. | 363/89 |

* cited by examiner

*Primary Examiner* — Jeffrey Sterrett
(74) *Attorney, Agent, or Firm* — William B. Kempler; Frederick J. Telecky, Jr.

(57) ABSTRACT

A method of operating a power factor correction (PFC) circuit and a corresponding power factor correction circuit include determining an adaptive switching frequency of the PFC circuit related to a current of the boost inductor of the PFC circuit, and operating the PFC circuit at a light load based on the adaptive switching frequency.

17 Claims, 8 Drawing Sheets

US 8,971,075 B2

METHOD AND APPARATUS FOR GENERATING AN ADAPTIVE SWITCHING FREQUENCY FOR OPERATING POWER FACTOR CORRECTION CIRCUIT

CROSS-REFERENCE TO RELATED APPLICATIONS

The present application claims priority to provisional application Ser. No. 61/440,146, filed Feb. 7, 2011, which is incorporated herein by reference in its entirety.

FIELD OF THE INVENTION

The field of the invention relates to a method of operating a PFC (power factor correction) circuit and corresponding power factor correction circuits. In particular, the invention relates to such methods and PFC circuits that provide reduced THD (total harmonic distortion) and improved efficiency in the PFC circuit while maintaining a high power factor.

BACKGROUND OF THE INVENTION

Many modern electronic systems utilize a PFC circuit as part of a power supply circuit. The PFC circuit is typically utilized to generate the bulk voltage for the rest of the system, and to shape the current waveform so that it tracks the incoming line voltage. By forcing the current waveform to match the incoming line voltage waveform, the load the system presents to the line looks resistive and the power factor is near 1.0. The PFC circuit conventionally does this by applying PWM (pulse width modulation) control to a power FET that is in series with a boost inductor across the line.

A schematic of such a conventional PFC circuit 100 is illustrated in prior art FIG. 1. The PFC circuit 100 includes input Vin 120, diodes D1-D4 130, inductor 140, FET Q1 150 having associated charge capacitor C1, diodes D5 and D6, and capacitor Co 170 across which output terminals 180 are disposed.

FIG. 2 illustrates the gate driver signal 210 typically applied to the FET 150, Vds of the FET 220, PFC boost inductor current 230, and the input voltage Vac 240. At light load, the PFC goes to discontinuous conduction mode, once the boost current declines to zero, and the boost inductor 140 will resonate with PFC FET Q1's parasitic capacitance C1. The resonant current becomes so significant that it distorts the AC current waveform. The resonant current contributes to total AC current, adding in one switching cycle, and may subtract in the next switching cycle, which causes large current steps. The current resonates between boost inductor and C1, causing a negative step in the boost inductor current, which may be seen at point 260, for example. This results in an increased THD (total harmonic distortion) in the PFC circuit. However, modern needs in PFC circuits are requiring lower THD.

As illustrated in FIGS. 3a and 3b, conventional PFC circuits are hard switching. The PFC FET turns on randomly in respect to resonant current's phase when boost current becomes discontinuous. There are chances that the FET may turn on at a high Vds voltage and result in significant switching loss. The above problems leave a need for a PFC circuit that can provide zero voltage and zero current switching to improve efficiency.

SUMMARY OF THE INVENTION

The present invention provides methods of operating a PFC circuit and a corresponding PFC circuit that include determining an adaptive switching frequency of the PFC circuit related to a current of the boost inductor of the PFC circuit, and operating the PFC circuit at a light load based on the adaptive switching frequency. The present invention may also provide methods of operating a PFC circuit and a corresponding PFC circuit that include determining if the PFC circuit is operating in a first mode or in another mode, and if the PFC is operating in the first mode, determining an adaptive switching frequency of the PFC circuit related to a current of a boost inductor of the PFC circuit, and operating the PFC circuit at a light load based on the adaptive switching frequency.

Other aspects, features, and advantages of the present invention will become apparent from the following detailed description when taken in conjunction with the accompanying drawings, which are a part of this disclosure and which illustrate, by way of example, principles of the invention.

BRIEF DESCRIPTION OF THE DRAWINGS

The accompanying drawings facilitate an understanding of the various examples of this technology. In such drawings.

DETAILED DESCRIPTION

The following description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

The disclosed methods of operating a PFC (power factor correction) circuit and corresponding PFC circuit provide reduced total harmonic distortion and increased efficiency while maintaining a high power factor. The methods operate the PFC circuit based on an adaptive switching frequency at light load (when the PFC circuit is in discontinuous-conduction mode). The PFC circuit includes a main PFC FET and a boost inductor, and the adaptive switching frequency of the PFC circuit is determined related to the current of the boost inductor, as further discussed below.

The methods of operating a PFC circuit at light load and associated PFC circuits utilize switching on of the PFC FET when the current through the PFC inductor is substantially zero and the voltage Vds applied to the PFC FET is substantially zero to reduce the THD and improve efficiency of the PFC circuit. This is achieved by determining a time that the current of the boost inductor resonates from a negative value to a zero value to generate a Syn signal. The Syn signal is then utilized to generate an adaptive switching frequency for the PFC circuit. The main PFC FET is turned on according to the Syn signal, achieving ZVS/ZCS (zero voltage switching/zero current switching) switching for the PFC circuit at light loads.

Figure 1:
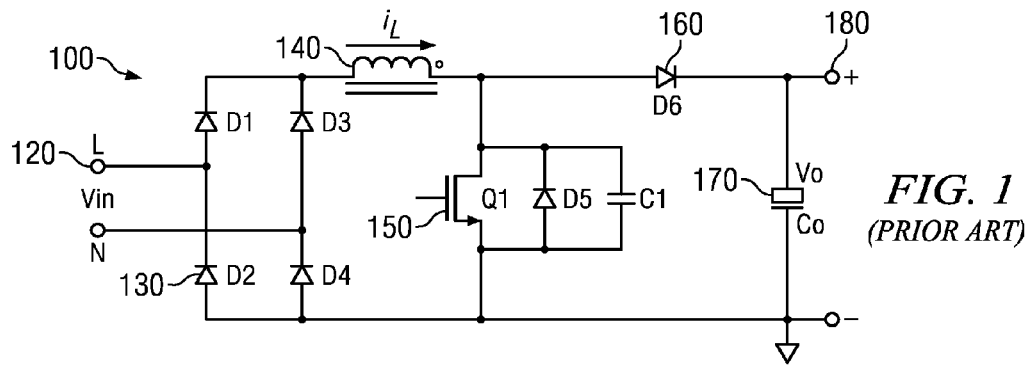
FIG. 1 depicts a schematic view of a PFC circuit according to the prior art.
Figure 2:
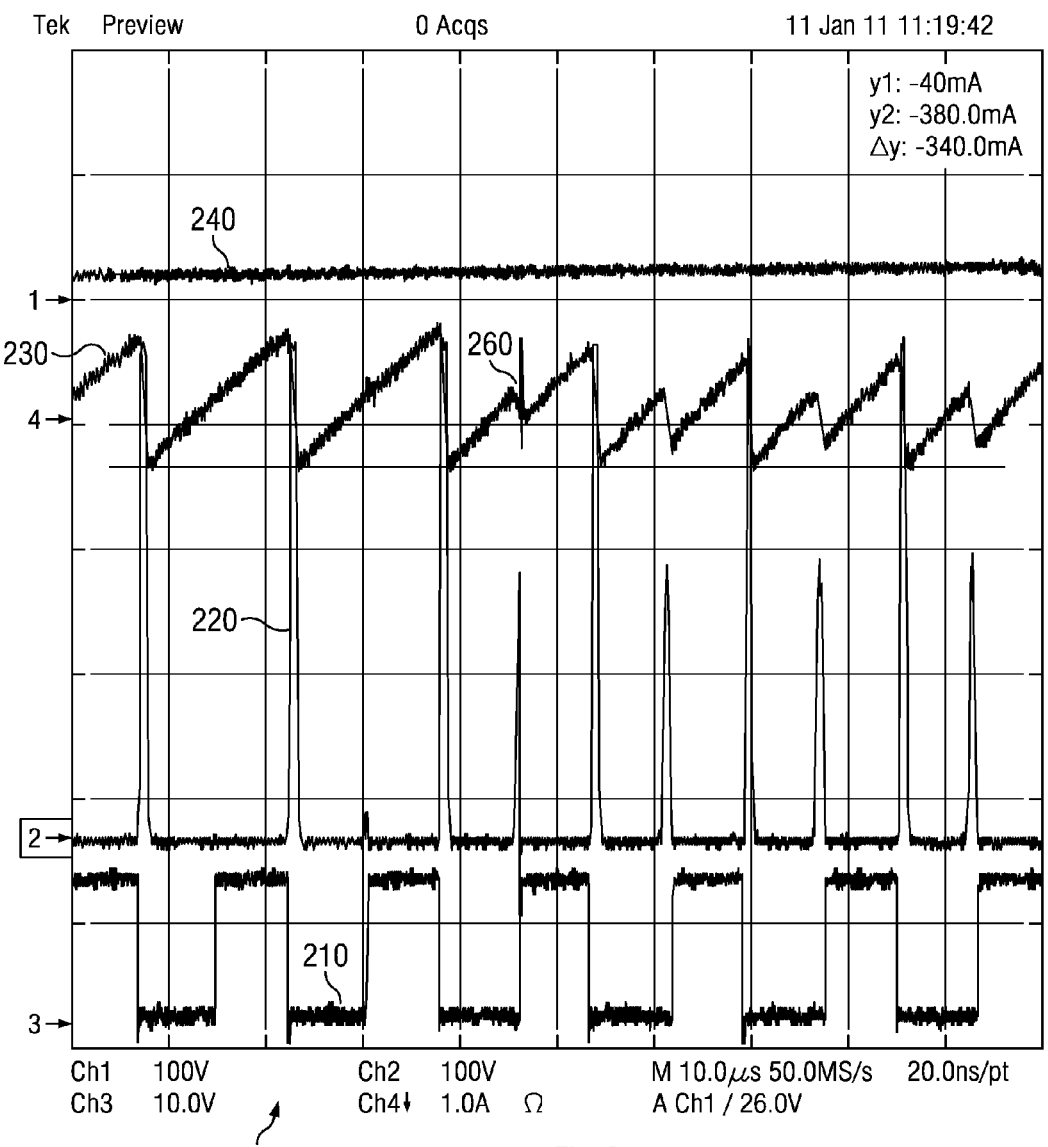
FIG. 2 depicts illustrative waveforms utilized with the PFC circuit of FIG. 1.
Figure 3A:
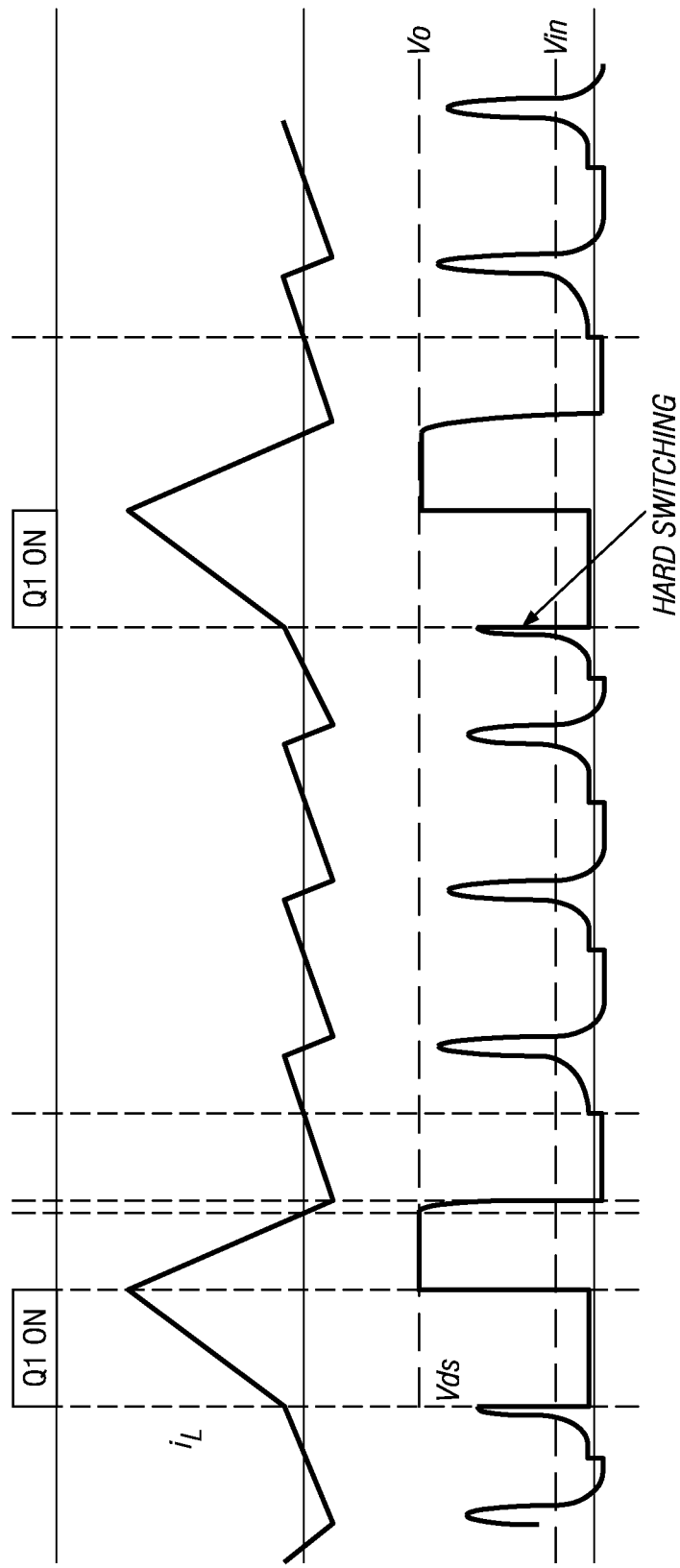
FIGS. 3a and 3b depict illustrative waveforms showing hard switching utilized with the PFC circuit of FIG. 1.
Figure 3B:
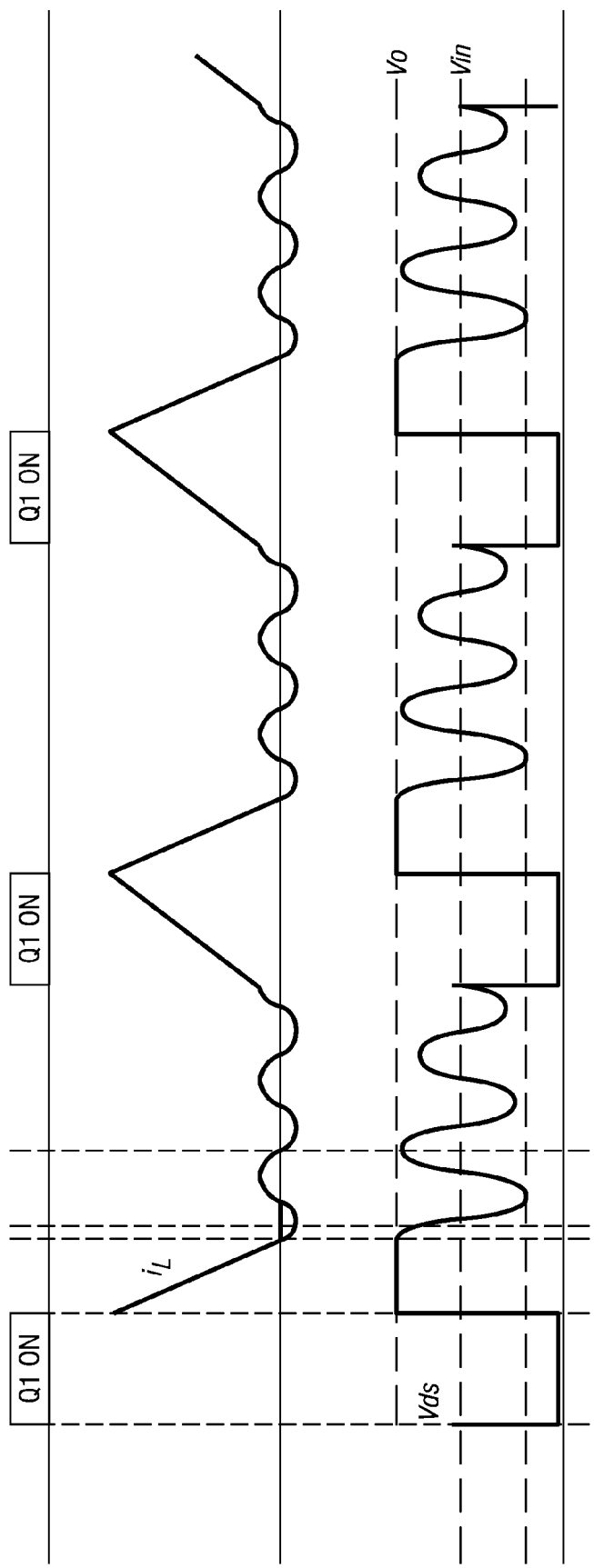
Figure 4:
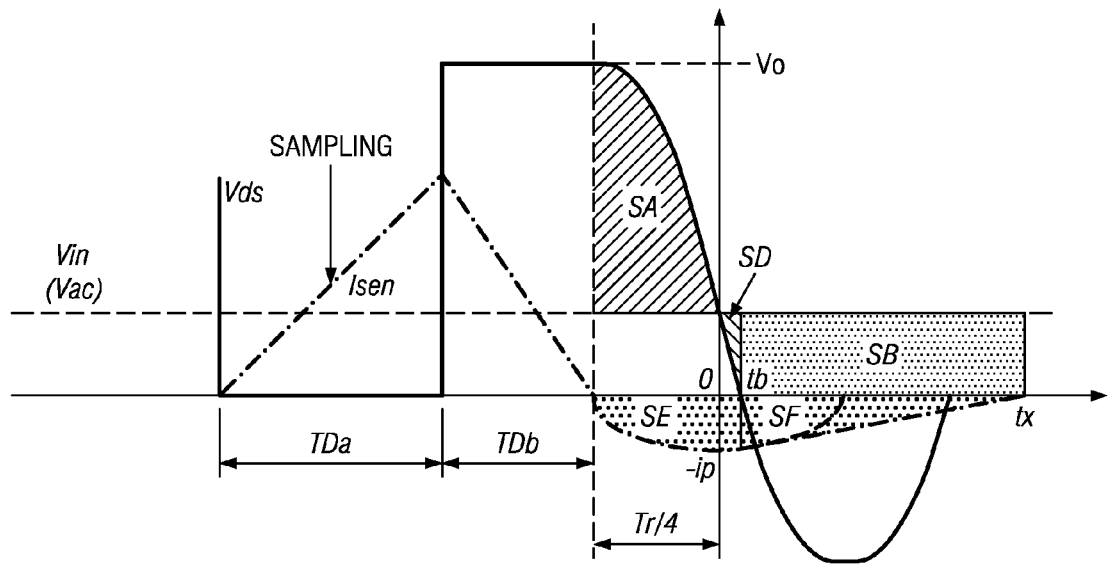
FIG. 4 depicts a graphic view illustrating prediction of zero voltage switching/zero current switching of the PFC circuit in accordance with embodiments of the invention.

FIG. 4 illustrates one possible ZVS/ZCS determination that may be used, although other such ZVS/ZCS determinations could be used. Given a PFC FET turn-on time TDa, by using Voltage*Second balance, the time for boost inductor current to return to zero is TDb=TDa*Vin/(Vo−Vin). The resonant frequency of the boost inductor and FET parasitic capacitance can be calculated or measured, and the quarter of resonant period is denoted as Tr/4. By using Voltage*Second balancing again, SA=SD+SB, tx (the time at which the boost current resonates from a negative value to a zero value) can be calculated. Therefore, in the next switching cycle the FET is turned on at TDa+TDb+Tr/4+tx, and both ZVS and ZCS are achieved at DCM (discontinuous-conduction mode) operation.

Figure 5:
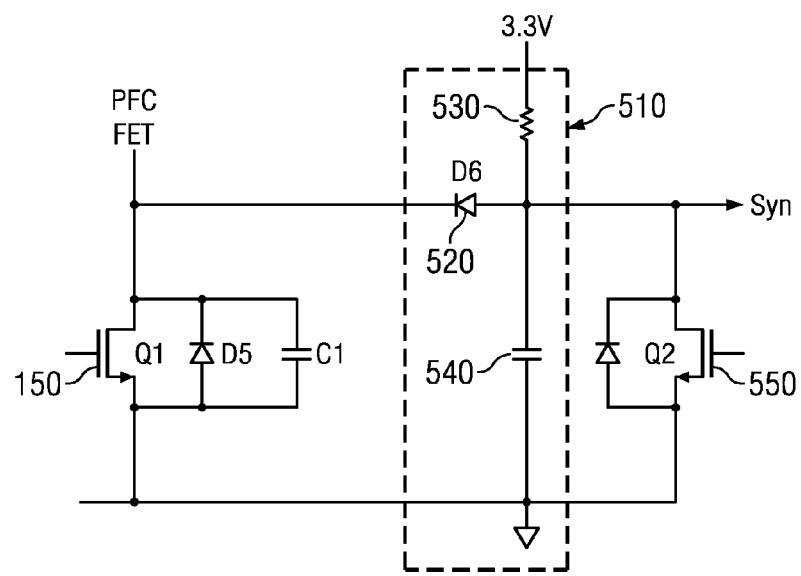
FIG. 5 depicts a schematic view of a PFC circuit FET, and a Syn signal generation circuit in accordance with embodiments of the invention.

FIG. 5 illustrates a Syn generation circuit 510. Syn generation circuit 510 includes diode D6 520, resistor 530 and capacitor 540. A pulse with width TDa+TDb+Tr/4+tx is generated and sent out by one GPIO (general purpose input output) to drive transistor Q2 550. During the Q2 on period, any new Syn signal is blocked. As soon as Q2 is turned off and ZVS/ZCS occurs, Syn becomes high and resets PWM to start a new PWM period and turns on the PFC FET. When Q2 is turned off, if a negative current is still flowing through Q1's body diode, Syn is pulled low by diode 520 to delay the starting of a new switching period, which will guarantee a new switching period to start at ZVS/ZCS.

Figure 6:
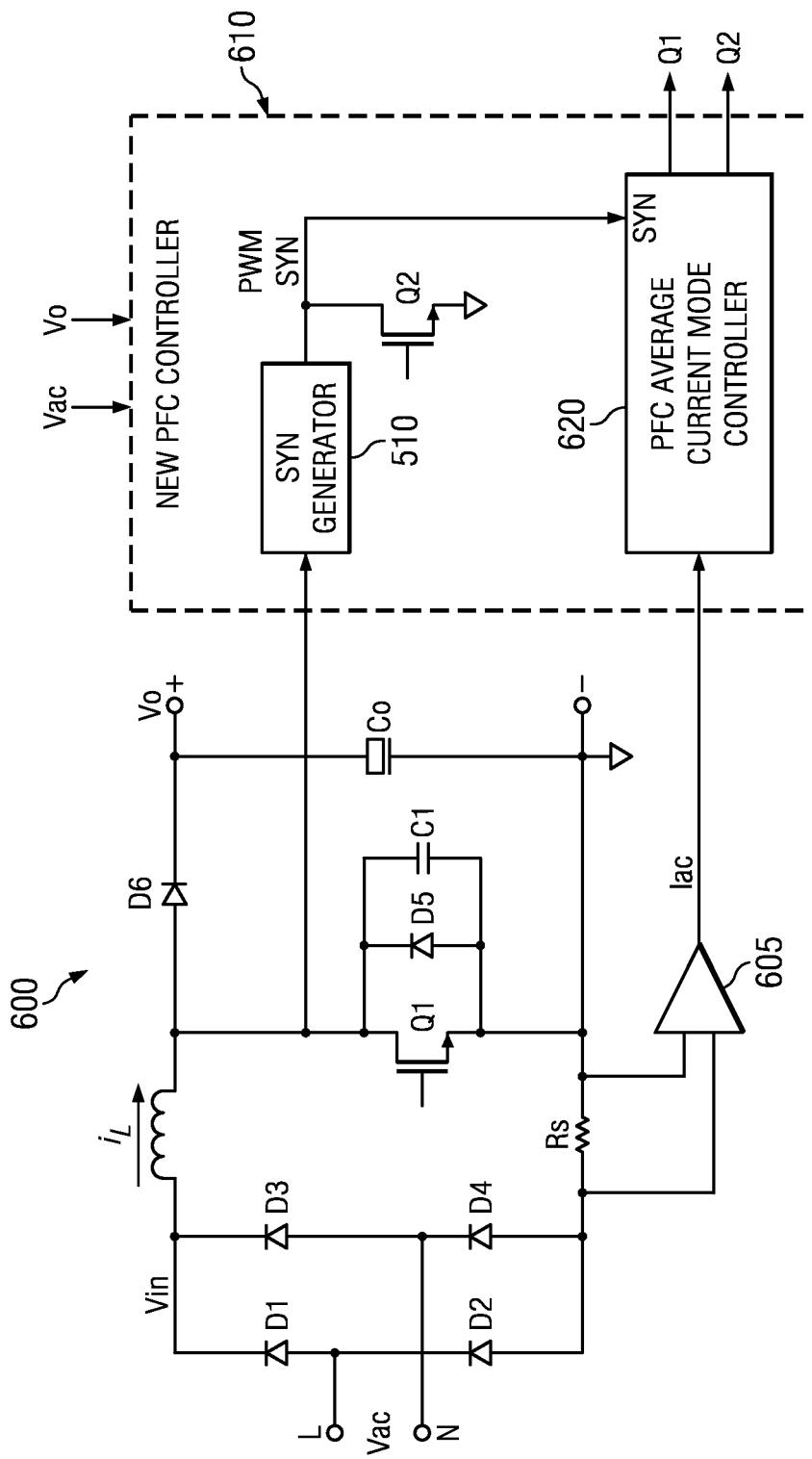
FIG. 6 depicts a schematic view of a PFC circuit and a PFC controller in accordance with embodiments of the invention.

FIG. 6 illustrates a PFC circuit 600 and a PFC controller 610. The PFC circuit 600 includes Input terminals L, N, diodes D1-D4, inductor I, FET Q1 and associated diode D5 and capacitor C1, capacitor Co, resistor Rs, and diode D6. Amplifier 605 is connected across resistor Rs.

The PFC controller 610 includes the Syn signal generator 510, FET Q2 and PFC Average Current Mode Controller 620. As explained above, the Syn generator 510 is utilized to generate the Syn signal for use in the PWM. The PFC controller 610 is utilized to control the operation of the PFC circuit 600, as further explained below in conjunction with FIGS. 7-9.

The input signal Vac and the output signal to the PFC circuit are input to the PFC controller 610. The PFC controller determines the operating mode of the PFC circuit (whether the PFC circuit is operating in DCM or CCM), and at low line or high line, and generates the switching frequency applied to Q1 of the PFC circuit, and signals applied to Q2 based on the operating mode, as further explained below in conjunction with FIGS. 7-9.

Figure 7:
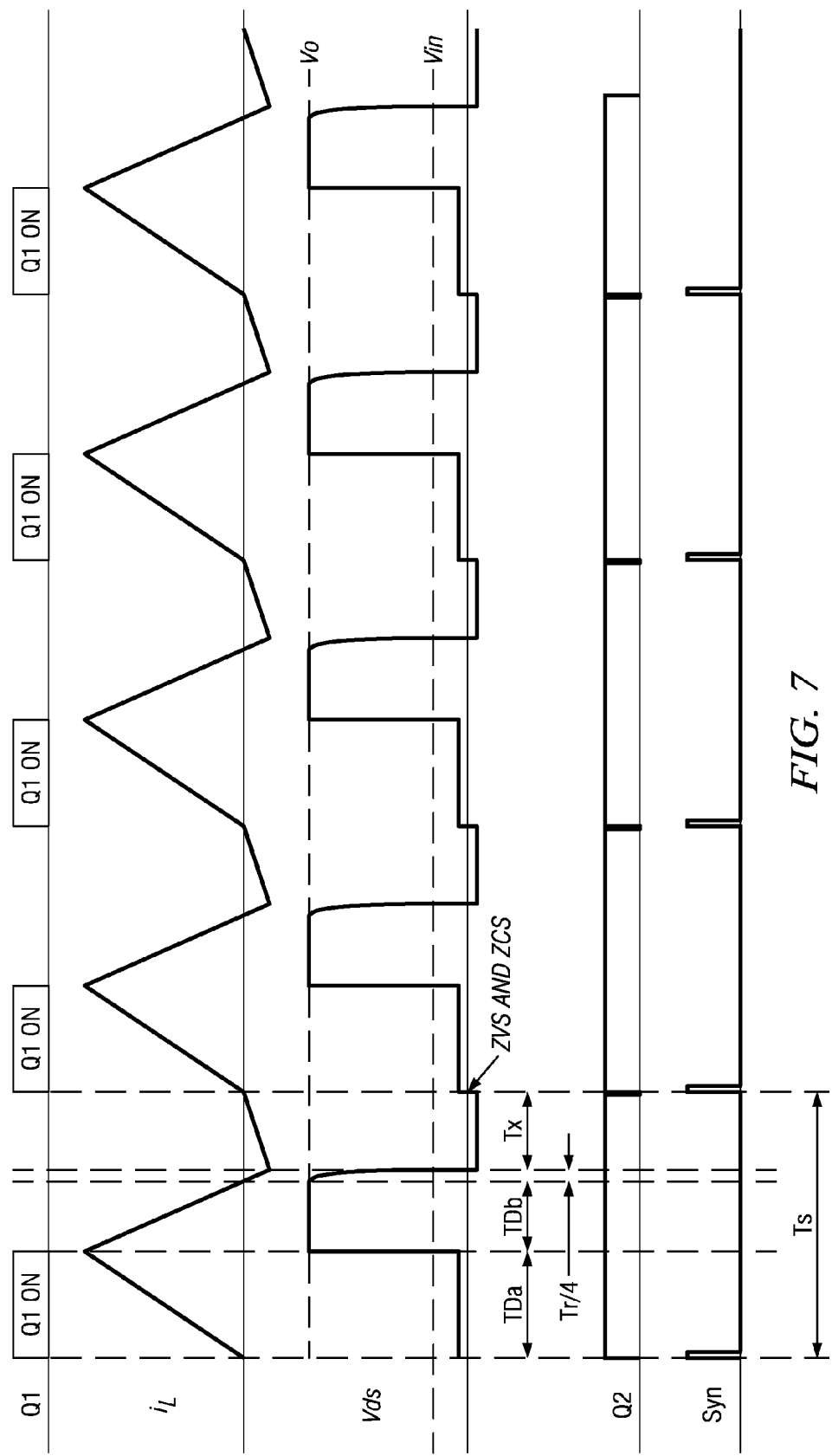
FIG. 7 depicts illustrative waveforms showing control of the PFC circuit when the PFC circuit is operating at low line and in discontinuous-conduction mode in accordance with embodiments of the invention.

FIG. 7 illustrates control of the PFC circuit 600 by the PFC controller 610 when the PFC circuit is operating at low line and in DCM. In particular, FIG. 7 illustrates the Vds signal at the PFC FET, and how Q2 is utilized to generate the Syn signal at ZVS (Vds is zero) and ZCS (boost inductor current IL is zero).

The Syn signal turns the PFC FET Q1 on and resets the PWM period. When Q1 turns off, the Vds signal pulses high, but this rising edge of Vds does not generate a Syn signal because Q2 is still on. Q2 turns off at the end of the TDa+TDb+Tr/4+tx pulse, at which time the boost current is negative. The Syn signal to again turn on Q1 is generated at TDa+TDb+Tr/4+tx, when Vds and IL are both substantially zero and Q2 is off.

Utilizing this method results in the PFC FET when operating at DCM always turning on at zero Vds (ZVS) and zero inductor current (ZCS), reducing switching power loss and total harmonic distortion. In contrast, without using this method, the PFC FET turns on at a random position which is a non-zero ZVS and ZCS, resulting in switching power loss and increased total harmonic distortion.

Figure 8:
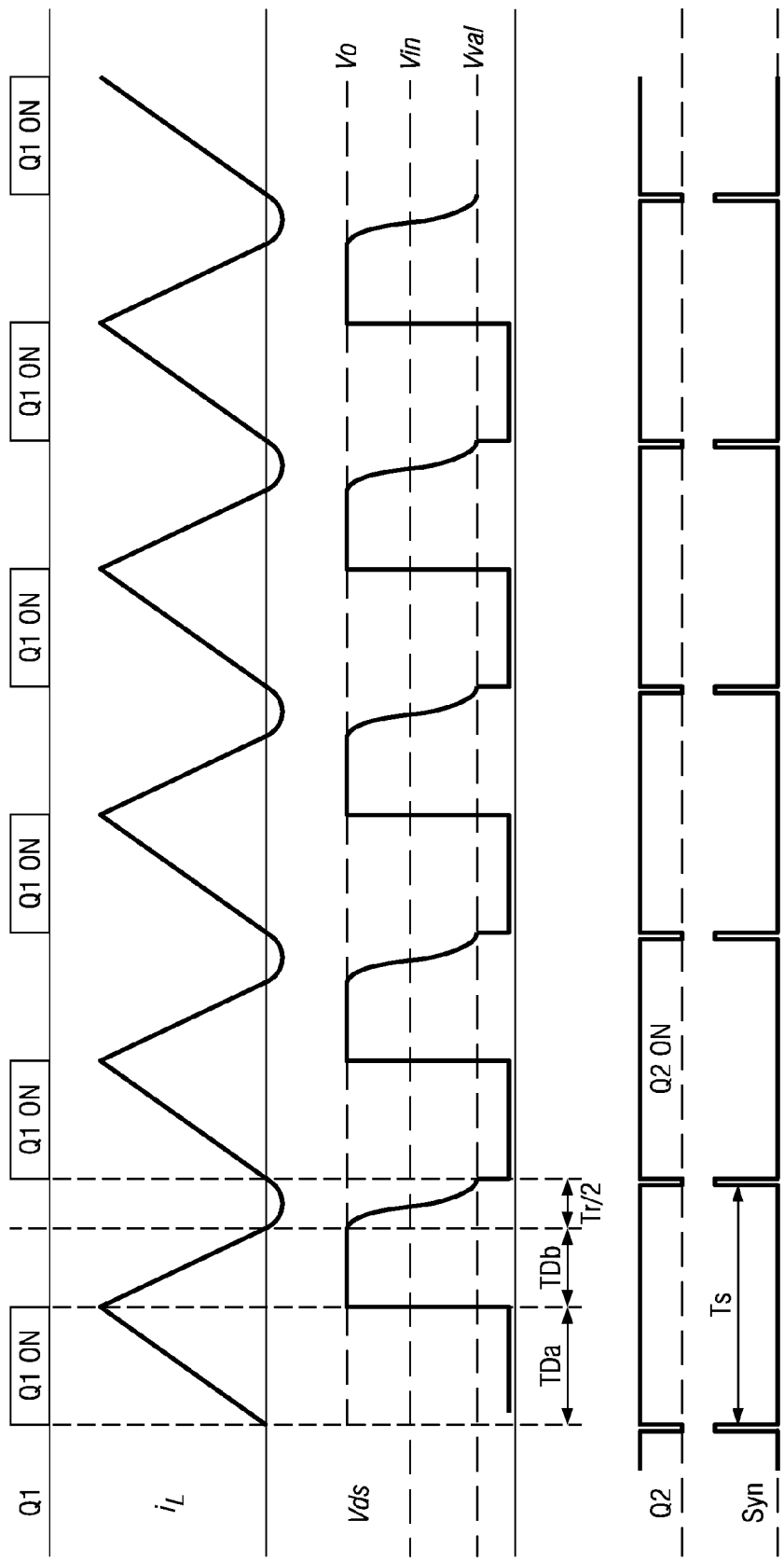
FIG. 8 depicts illustrative waveforms showing control of the PFC circuit when the PFC circuit is operating at high line and in a discontinuous-conduction mode in accordance with embodiments of the invention.

FIG. 8 illustrates control of the PFC circuit 600 by the PFC controller 610 when the PFC circuit is operating at high line and in DCM. In particular, FIG. 8 illustrates at the moment the instantaneous Vac is higher than ½ Vbus, Q2 is on until TDa+TDb+Tr/2, the Syn signal is generated at TDa+TDb+Tr/2 after Q2 turns off. The Syn signal turns on PFC FET Q1 and resets the PWM period. Vds does not go to zero in this case, however, the PFC FET is turned on when Vds is at its lowest point and IL is zero, so that ZCS is still achieved.

Figure 9:
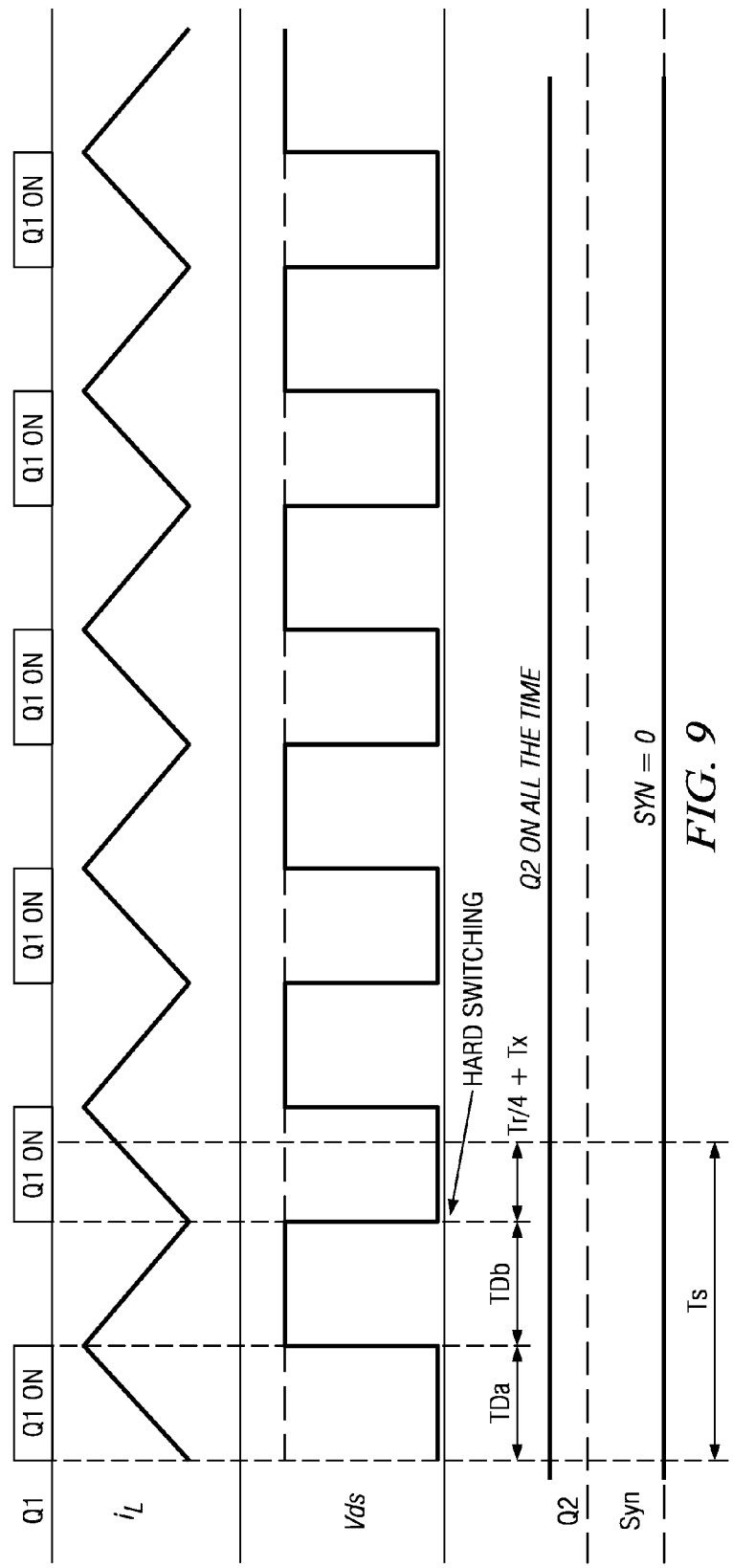
FIG. 9 depicts illustrative waveforms showing control of the PFC circuit when the PFC circuit is operating at continuous-conduction mode in accordance with embodiments of the invention.

FIG. 9 illustrates control of the PFC circuit 600 by the PFC controller 610 when the PFC is operating at CCM. In particular, FIG. 9 illustrates the Vds signal at the PFC FET, and how the Syn signal stays low and Q2 is on all the time. Thus, in CCM, the PFC controller 610 operates the PFC circuit as a regular fixed frequency PFC. The PFC FET Q1 is not turned on early as it is in the DCM mode.

Figure 10:
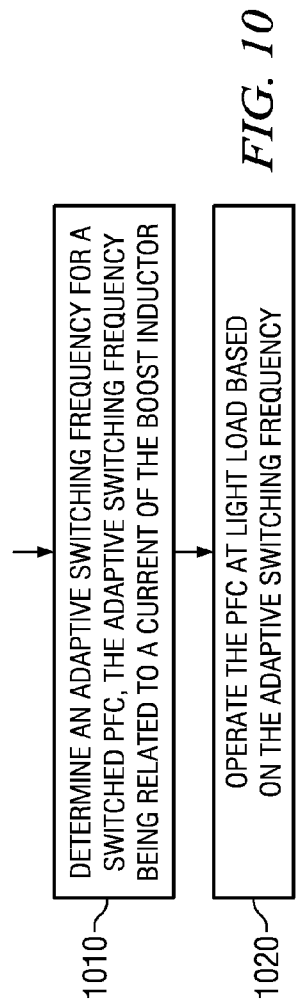
FIG. 10 depicts a flowchart in accordance with embodiments of the invention.

FIG. 10 is a flow chart illustrating operation of the PFC circuit operating at light load. In step 1010, an adaptive switching frequency is determined for a switched PFC circuit related to a current of the boost inductor of the PFC circuit. This step may be accomplished by the Syn generator 510 illustrated in FIGS. 5 and 6, for example, although other circuits or software could accomplish the determination. The Syn signal may be utilized to set the adaptive switching frequency of the PFC circuit by controlling when to turn on the main PFC FET according to the boost inductor current.

In step 1020, the PFC circuit is operated at light load based on the adaptive switching frequency. As explained above, the Syn signal is generated by determining a time at which the boost inductor current resonates from a negative value to a zero value, and the PFC circuit is operated at light load by turning on the main PFC circuit FET at ZVS/ZCS based on the Syn signal.

The use of the above-described methods also results in lower THD and increased efficiency at low line in the PFC circuit, as shown below:

| Without method | | | | | With method | | | | |
|---|---|---|---|---|---|---|---|---|---|
| Pin(W) | Pout(W) | Efficiency | THD(%) | PF | Pin(W) | Pout(W) | Efficiency | THD(%) | PF |
| 37.7 | 31.833 | 0.844 | 6.25 | 0.98 | 37.4 | 31.833 | 0.851 | 4.97 | 0.99 |
| 70 | 62.487 | 0.893 | 4.44 | 0.99 | 69.3 | 62.487 | 0.902 | 3.38 | 1 |
| 106.4 | 97.071 | 0.912 | 3.99 | 1 | 104.8 | 96.678 | 0.923 | 2.56 | 1 |
| 183.6 | 170.562 | 0.929 | 2.45 | 1 | 183.2 | 171.348 | 0.935 | 2.08 | 1 |

At high line, the THD is similar while efficiency is slightly increased at heavy load, as shown below:

| Without method | | | | | With method | | | | |
|---|---|---|---|---|---|---|---|---|---|
| Pin(W) | Pout(W) | Efficiency | THD(%) | PF | Pin(W) | Pout(W) | Efficiency | THD(%) | PF |
| 37.4 | 31.833 | 0.851 | 6.85 | 0.89 | 42.5 | 31.833 | 0.749 | 5.71 | 0.92 |
| 68.4 | 62.094 | 0.908 | 4.34 | 0.96 | 74.9 | 62.487 | 0.834 | 4.87 | 0.97 |
| 103.5 | 96.285 | 0.930 | 3.24 | 0.98 | 103.9 | 96.678 | 0.930 | 3.56 | 0.99 |
| 179.8 | 170.955 | 0.951 | 2.99 | 0.99 | 178.5 | 170.562 | 0.956 | 3.13 | 1 |
| 298.3 | 286.497 | 0.960 | 3.29 | 1 | 298.5 | 287.676 | 0.964 | 2.38 | 1 |

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A method of operating a PFC (power factor correction) circuit having a main PFC FET and a boost inductor, the method comprising:
   determining an adaptive switching frequency of the PFC circuit related to a current of the boost inductor; and
   operating the PFC circuit at a light load based on the adaptive switching frequency, wherein determining the adaptive switching frequency of the PFC circuit comprises determining a time that the current of the boost inductor resonates from a negative value to a zero value, and generating the adaptive switching frequency based on the determined time.

2. The method of claim 1, wherein operating the PFC circuit at a light load is operating the PFC circuit at DCM (discontinuous-conduction mode).

3. The method of claim 1, wherein determining the adaptive switching frequency of the PFC circuit further comprises generating a Syn signal based on the time that the current of the boost inductor resonates from a negative value to a zero value, and turning on the main PFC FET based on the Syn signal.

4. The method of claim 3, wherein the main PFC FET is turned on when a voltage Vds of the main PFC FET is substantially equal to zero or at its lowest point, and a current flowing through the inductor is substantially equal to zero.

5. The method of claim 1, further comprising operating the PFC circuit at the adaptive switching frequency when the PFC circuit is operating in a first mode, and operating the PFC circuit at a switching frequency other than the adaptive switching frequency when the PFC circuit is operating in a mode other than the first mode.

6. The method of claim 5, wherein the first mode is a light load operating mode.

7. A method of operating a PFC (power factor correction) circuit having a main PFC FET and a boost inductor, the method comprising:
   determining if the PFC circuit is operating in a first mode or in another mode;
   if the PFC circuit is operating in the first mode, determining an adaptive switching frequency of the PFC circuit related to a current of the boost inductor; and
   operating the PFC circuit at a light load based on the adaptive switching frequency, wherein determining the adaptive switching frequency of the PFC circuit further comprises generating a Syn signal based on a time that the current of the boost inductor resonates from a negative value to a zero value, and turning on the main PFC FET based on the Syn signal.

8. The method of claim 7, wherein operating the PFC circuit at a light load is operating the PFC circuit at DCM (discontinuous-conduction mode).

9. The method of claim 7, further comprising operating the PFC circuit at a switching frequency other than the adaptive switching frequency when the PFC circuit is operating in a mode other than the first mode.

10. The method of claim 7, wherein the main PFC FET is turned on when a voltage Vds of the main PFC FET is substantially equal to zero or at its lowest point, and a current flowing through the inductor is substantially equal to zero.

11. The method of claim 7, wherein the first mode is a light load operating mode.

12. A PFC (power factor correction) circuit having a main PFC FET and a boost inductor, comprising:
   a Syn signal generator that detects a current of the boost inductor; and
   a controller that determines an adaptive switching frequency based on the current of the boost inductor and controls operation of the PFC circuit at a light load based on the adaptive switching frequency, wherein the controller determines the adaptive switching frequency of the PFC circuit by determining a time that the current of the boost inductor resonates from a negative value to a zero value, and generates the adaptive switching frequency based on the determined time.

13. The PFC circuit of claim 12, wherein the controller operates the PFC circuit at the adaptive switching frequency when the PFC circuit is operating in a first mode, and operates the PFC circuit at another frequency when the PFC circuit is operating in a mode other than the first mode.

14. The PFC circuit of claim 13, wherein the first mode is a light load operating mode.

15. The PFC circuit of claim 12, wherein operating the PFC circuit at a light load is operating the PFC circuit at DCM (discontinuous-conduction mode).

16. The PFC circuit of claim 12, wherein the Syn signal generator generates a Syn signal based on the time that the current of the boost inductor resonates from a negative value to a zero value, and causes turning on of the main PFC FET based on the Syn signal.

17. The PFC circuit of claim 16, wherein the main PFC FET is turned on when a voltage Vds of the main PFC FET is substantially equal to zero or at its lowest point, and a current flowing through the inductor is substantially equal to zero.

\* \* \* \* \*